(12) United States Patent
Alberda (10) Patent No.: US 11,485,515 B2
(45) Date of Patent: Nov. 1, 2022

(54) METHOD AND SYSTEM FOR OPERATING AN AIRCRAFT

(71) Applicant: GE AVIATION SYSTEMS LLC, Grand Rapids, MI (US)

(72) Inventor: Matthew Scott Alberda, Jenison, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 16/829,232

(22) Filed: Mar. 25, 2020

(65) Prior Publication Data

US 2021/0300587 A1 Sep. 30, 2021

(51) Int. Cl.
| | | |
|---|---|---|
| *G01S 19/47* | (2010.01) | |
| *B64D 43/00* | (2006.01) | |
| *G01C 21/16* | (2006.01) | |
| *G01S 19/49* | (2010.01) | |
| *B64C 13/18* | (2006.01) | |

(52) U.S. Cl.
CPC ........... *B64D 43/00* (2013.01); *G01C 21/165* (2013.01); *G01S 19/47* (2013.01); *G01S 19/49* (2013.01); *B64C 13/18* (2013.01)

(58) Field of Classification Search
CPC ....... B64D 43/00; G01C 21/165; G01S 19/47; G01S 19/49; B64C 13/18
See application file for complete search history.

(56) References Cited

U.S. PATENT DOCUMENTS

| | | | |
|---|---|---|---|
| 5,757,316 A | 5/1998 | Buchler | |
| 5,784,029 A * | 7/1998 | Geier | G01C 21/165 |
| | | | 342/357.52 |
| 6,992,617 B2 | 1/2006 | van Diggelen et al. | |
| 7,956,806 B2 | 6/2011 | Liu et al. | |
| 8,928,527 B2 | 1/2015 | He et al. | |
| 9,658,339 B2 | 5/2017 | Destelle | |
| 2017/0155443 A1* | 6/2017 | Haziza | H04B 1/69 |
| 2017/0322303 A1 | 11/2017 | Reynolds et al. | |
| 2018/0069642 A1 | 3/2018 | Muakkit et al. | |
| 2018/0084476 A1 | 3/2018 | Kay et al. | |
| 2018/0341274 A1* | 11/2018 | Donnelly | G08G 1/096827 |
| 2019/0090147 A1 | 3/2019 | Durvasula et al. | |
| 2019/0094371 A1 | 3/2019 | Biacs et al. | |
| 2021/0159971 A1* | 5/2021 | Panchai | H04B 7/1855 |

OTHER PUBLICATIONS

Debruin J: "Control systems for mobile Satcom antennas", 1,2,9-15 Inv. IEEE Control Systems Magazine, IEEE Service Center, Piscataway, NJ, US, vol. 28, No. 1, Feb. 1, 2008 (Feb. 1, 2008), pp. 86-101, XP011224593, ISSN: 0272-1708, DOI: 10.1109/MCS.2007. 910205, p. 97-p. 101.

(Continued)

*Primary Examiner* — Mathew Franklin Gordon
(74) *Attorney, Agent, or Firm* — McGarry Bair PC (57) ABSTRACT

An apparatus and method for operating a communication system for a vehicle, comprising a directed communication receiver configured to output a signal related to beam tracking strength, an inertial reference module configured to receive the beam tracking strength and provide a heading observation based thereon. At least one indicator communicably coupled with the inertial reference module to provide an indication related to the heading of the vehicle.

20 Claims, 5 Drawing Sheets

(56) References Cited

OTHER PUBLICATIONS

Anand Oka et al: "Distributed target tracking using signal strength measurements by a wireless sensor network", IEEE Journal on Selected Areas in Communications, IEEE Service Center, Piscataway, US, vol. 28, No. 7, Sep. 1, 2010 (Sep. 1, 2010), pp. 1006-1015, XP011336905, ISSN: 0733-8716, DOI: 10.1109/SAC.2010. 100905, Abstract, Section I.

Huang Sijie et al: "Research on UAV 3-8 Flight Performance Test Method Based on Dual Antenna GPS/INS Integrated System", 2018 IEEE 3rd International Conference on Communication and Information Systems (ICCIS). IEEE, Dec. 28, 2018 (Dec. 28, 2018), pp. 106-116, XP033521704, DOI: 10.1109/COMIS.2018.8644961 retrieved on Feb. 19, 2019.

Zongwei Wu et al: "Low-Cost Antenna 1-15 Attitude Estimation by Fusing Inertial Sensing and Two-Antenna GPS for Vehicle-Mounted Satcom-on-the-Move", IEEE Transactions on Vehicular Technology, IEEE Service Center, Piscataway, NJ, US, vol. 62, No. 3, Mar. 1, 2013, pp. 1084-1096, XP011496615, ISSN: 0018-9545, DOI: 10.1109/TVT.2012.2229306.

\* cited by examiner

METHOD AND SYSTEM FOR OPERATING AN AIRCRAFT

TECHNICAL FIELD

The disclosure generally relates to a method of and communication system for operating a vehicle, more particularly, relates to a system for determining a satellite signal strength related to beam tracking strength.

BACKGROUND

Aircraft utilize satellite-inertial navigation systems for determining information for use during flight. The use of the term "satellite" is meant to include not only earth-circling satellites of all varieties but also other forms of platforms that can be cooperatively used in establishing the position and attitude of a platform that carries an inertial navigation system.

The Global Positioning System (GPS), the current exemplar of an earth-orbiting satellite navigation system, consists of 24 globally-dispersed satellites with synchronized atomic clocks. The user, knowing the positions, velocities, and clock errors of the satellites, can compute his own position, velocity, and clock error from the measured pseudoranges and delta ranges. The use of three spatially-distributed antennas on a platform permits the accurate determination with GPS signals alone of pitch, roll, and heading. However, if the platform is a highly-maneuverable aircraft, it becomes necessary to integrate the platform GPS equipment with an inertial navigation unit. GPS compensates for inertial navigation system drifts and when platform maneuvering or other occurrences causes GPS to become temporarily inoperative, the inertial navigation system (INS) carries on until the GPS again becomes operative.

BRIEF DESCRIPTION

In one aspect, the present disclosure relates to a method of operating an aircraft, including flying an aircraft along a heading, receiving a directed signal from a signal source at an antenna on the aircraft to define a received signal, determining a signal strength of the received signal, defining a first heading observation based on the signal strength, and indicating at least one of a heading variance or a figure of merit based on the first heading observation.

In another aspect, the present disclosure relates to a communication system for a vehicle, comprising a directed communication receiver configured to output a signal related to beam tracking strength; an inertial reference module configured to receive the beam tracking strength and provide a heading observation based thereon, the inertial reference module configured to determine a heading variance indicative of a quality of a heading of the vehicle based on at least the heading observation and provide an output related to the heading variance, the inertial reference module configured to provide a heading observation and output related to the heading variance in a radio navigation aid deprived environment; and at least one indicator communicably coupled with the inertial reference module, the at least one indicator located within the vehicle, the at least one indicator providing an indication related to a validity of the heading of the vehicle based on the heading variance.

DETAILED DESCRIPTION

Aspects of the present disclosure relate to satellite communication (SATCOM) systems that monitor signal tracking strength to determine that they are receiving from and broadcasting to the proper satellite in space. This determination can aid in accuracy of operation including flight of an aircraft by way of non-limiting example.

Heading observations are traditionally obtained from radio navigation aids (such as a Global Positioning System (GPS) receiver or a Global Navigation Satellite System (GNSS) receiver). These require that the system can receive these external radio signals. Traditional radio navigation aids like GPS are easily jammed. Radio jamming or operation in a GPS denied environment prevents the inertial system from obtaining a heading observation. Without external observations, the inertial system will drift off and the pointing solution, or the ability to accurately determine the heading for a vehicle and provide as a reference to direction-oriented systems, will degrade. The SATCOM signal tracking strength does not rely on traditional land-based radio signals or weak GPS satellite signals that can be jammed.

SATCOM connectivity on its own is not subject to GPS jamming. If the inertial pointing solution of a vehicle is degraded from a lack of GPS heading observations, then the vehicle may not be able to maintain an accurate heading due to inertial sensor drift. Aspects of the present disclosure provide a heading observation independent from GPS to correct for inertial drift or provide an indication of the amount of drift, and maintain the pointing solution for a longer period of time.

It will be understood that signal strength rolls off as the antenna pointing solution drifts. An inertial reference unit can be responsible for providing this antenna pointing solution which can be a combination of heading, pitch, roll, rates, position, and timing data. Feeding the signal tracking strength back to the inertial reference unit allows it to form a heading observation. This heading observation indicates the quality of the heading solution provided by the inertial reference unit. This heading observation can be used in a multi-state Kalman Filter to correct for inertial sensor drift and maintain a valid heading for a longer duration.

Figure 1:
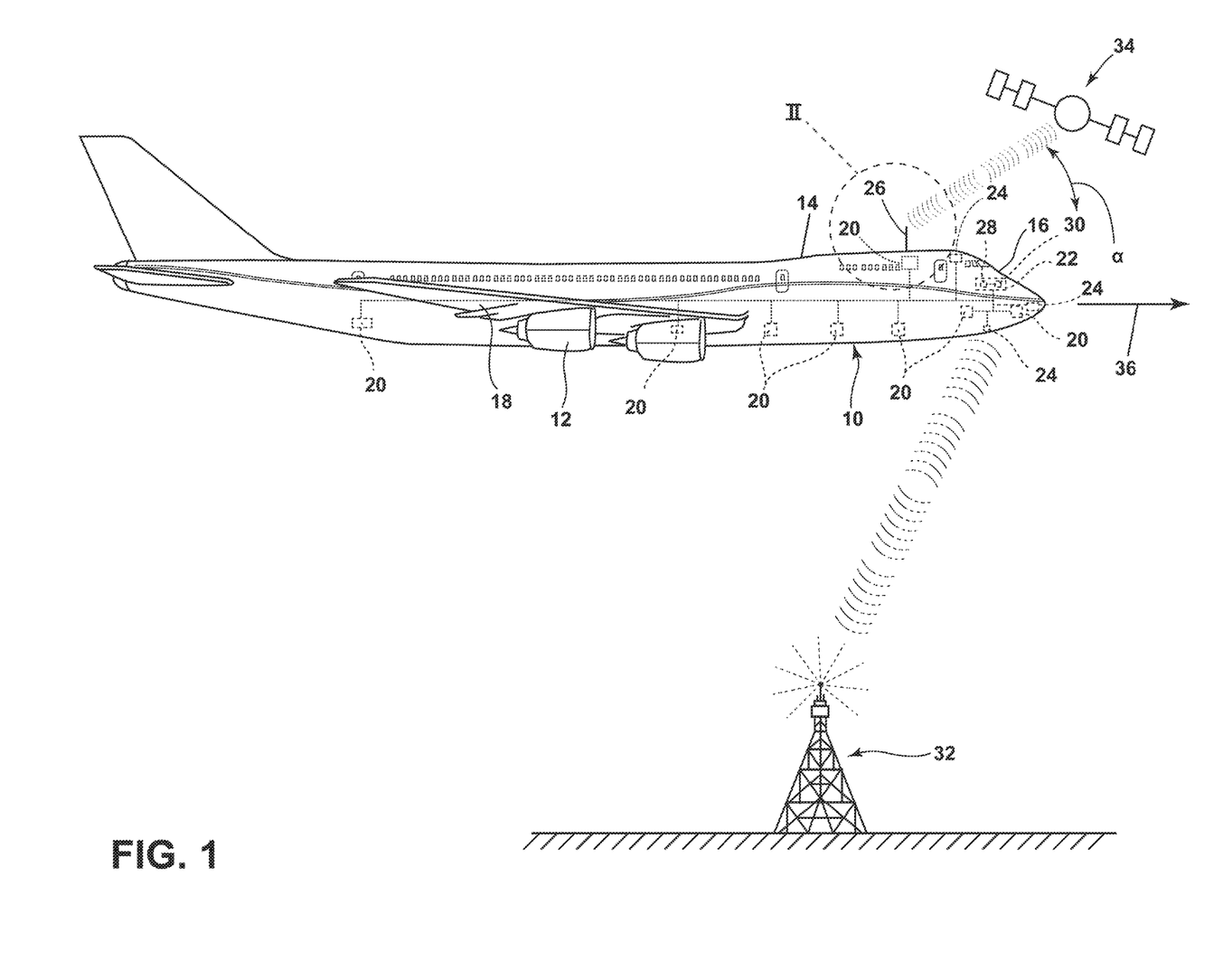
FIG. 1 is a schematic illustration of an aircraft with multiple aircraft systems according to aspects described herein.

It will thus be understood that an aircraft 10 illustrated in FIG. 1 can provide an environment for implementation of the described communication and Inertial Navigation System (INS) functions herein. More specifically, for this implementation, the functionality will be implemented on aircraft 10. The aircraft 10 can include one or more propulsion engines 12 coupled to a fuselage 14. A cockpit 16 can be positioned in the fuselage 14 and wing assemblies 18 can extend outwardly from the fuselage 14. Further, a set of aircraft systems 20 that enable proper operation of the aircraft 10 can include one or more controllers, computers or controller modules 22, a communication system having a communication link 24, and an antenna 26. The antenna 26 can be positioned to receive directed signals, specifically, by way of non-limiting example, signals associated with a SATCOM system.

It will be understood that "a set" can include any number of aircraft system(s), including only one aircraft system. While a commercial aircraft has been illustrated, it is contemplated that aspects of the disclosure can be used in any type of aircraft, for example, without limitation, fixed-wing, rotating-wing, rocket, personal aircraft, Unmanned Aerial Systems (UASs), and military aircraft.

Additionally, as used herein, a "controller" or "controller module" can include a component configured or adapted to provide instruction, control, operation, or any form of communication for operable components to affect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

Additionally, as used herein, elements being "electrically connected," "electrically coupled," or "in signal communication" can include an electric transmission or signal being sent, received, or communicated to or from such connected or coupled elements. Furthermore, such electrical connections or couplings can include a wired or wireless connection, or a combination thereof.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor as defined above, and the controller module or processor can perform processing on the value to determine a representative value or an electrical characteristic representative of said value.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The set of aircraft systems 20 can reside within the cockpit 16, within the electronics and equipment bay (not shown), or in other locations throughout the Aircraft 10 including that they can be associated with the engines 12. Such aircraft systems 20 can include but are not limited to an electrical system, an oxygen system, hydraulics or pneumatics system, a fuel system, a propulsion system, flight controls, audio/video systems, an Integrated Vehicle Health Management (IVHM) system, and systems associated with the mechanical structure of the aircraft 10.

The controller module 22, which can be an FMS or one or more other systems can be operably coupled to the set of aircraft systems 20 and can aid in operating the set of aircraft systems 20 and can receive information from the set of aircraft systems 20 and the communication link 24. The controller module 22 can, among other things, automate the tasks of piloting and tracking the flight plan of the aircraft 10. The controller module 22 can also be connected with other controllers or computers of the aircraft 10. It will be understood that the controller module 22 can be a larger system than that illustrated and that the drawings are merely for illustrative purposes only.

The controller module 22 can include memory 28, the memory 28 can include Random Access Memory (RAM), Read-Only Memory (ROM), flash memory, or one or more different types of portable electronic memory, such as discs, DVDs, CD-ROMs, etc., or any suitable combination of these types of memory. The controller module 22 can include one or more processors 30, which can be running any suitable programs. It will be understood that the controller module 22 can include or be associated with any suitable number of individual microprocessors, power supplies, storage devices, interface cards, auto flight systems, flight management computers, and other standard components and that the controller module 22 can include or cooperate with any number of software programs (e.g., flight management programs) or instructions designed to carry out the various methods, process tasks, calculations, and control/display functions necessary for operation of the aircraft 10.

The communication link 24 and antenna 26 can be communicably coupled to the controller module 22 or other processors of the aircraft to transfer information to and from the aircraft 10. It is contemplated that the communication link 24 and antenna 26 can be wireless and can be any variety of communication mechanism capable of wirelessly linking with other systems and devices and can include, but is not limited to, satellite uplink, SATCOM internet, VHF Data Link (VDL), ACARS network, Aeronautical Telecommunication Network (ATN), Automatic Dependent Surveillance-Broadcast (ADS-B), Wireless Fidelity (WiFi), WiMax, 3G wireless signal, Code Division Multiple Access (CDMA) wireless signal, Global System for Mobile communication (GSM), 4G wireless signal, Long Term Evolution (LTE) signal, or any combinations thereof. It will also be understood that the particular type or mode of wireless communication is not critical to aspects of the disclosure, and later-developed wireless networks are certainly contemplated as within the scope of aspects of the disclosure. Further, the communication link 24 and antenna 26 can be communicably coupled with the controller module 22 through a wired link without changing the scope of aspects of the disclosure. Although only one communication link 24 and antenna 26 have been illustrated, it is contemplated that the aircraft 10 can have multiple communication links and antennas communicably coupled with the controller module 22. Such multiple communication links and antennas can provide the aircraft 10 with the ability to transfer information to or from the aircraft 10 in a variety of ways.

As illustrated, the controller module 22 can communicate with a designated ground station 32 via the communication link 24. The ground station 32 can be any type of communicating ground station 32 such as one operated by an Air Service Navigation Provider (ANSP) and/or Air Traffic Control (ATC). The controller module 22 can request and receive information from the designated ground station 32 or the designated ground station 32 can send a transmission to the Aircraft 10.

The controller module 22 can also communicate with a satellite 34 via the antenna 26. The satellite 34 can be any type of satellite, including but not limited to Geostationary satellites. The controller module 22 can request and receive information from the satellite 34 or the satellite 34 can send a transmission to the aircraft 10. SATCOM connectivity on its own is not subject to GPS jamming because the satellites in a SATCOM system are geosynchronous. When the pointing solution drifts outside of an angle beam width ($\alpha$) the signal strength decreases. Therefore, it is optimal to keep the pointing solution within the angle beam width ($\alpha$). Signals associated with a heading 36 for a planned navigational route can be communicated from the designated ground station 32 to the computer and/or from the satellite 34 to the computer.

Figure 2:
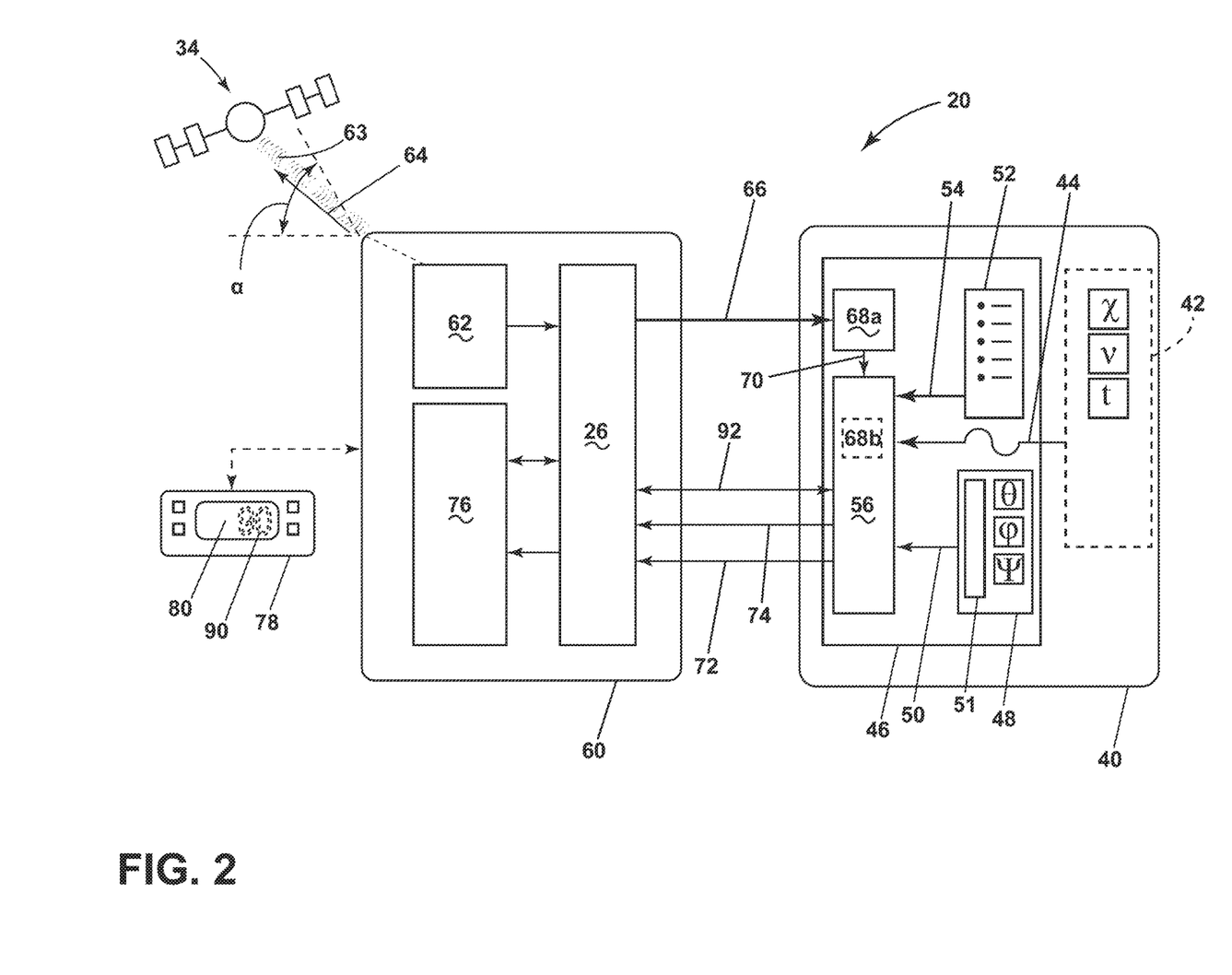
FIG. 2 is a block diagram of at least one of the aircraft systems from FIG. 1 that can be utilized with the aircraft.

As illustrated more clearly in FIG. 2 from the call-out II of FIG. 1, the controller module 22 can be in communication with the set of aircraft systems 20, including specifically an inertial navigation system (INS) 40. The INS 40 can include at least one receiver 42 for receiving location signals 44 that indicate at least one of position (x), velocity (v), or timing (t) information associated with the aircraft 10. The receiver 42 can include, but is not limited to, a GNSS receiver or a GPS receiver, or can include both GNSS and GPS receivers. It is contemplated that other known satellites can communicate with the receiver 42 to send the location signals 44, these satellites can be for example but not limited to Galileo satellites, COMPASS MEO satellites, GPS satellites, GLONASS satellites, NAVIC satellites, QZSS satellites or BeiDou-2 satellites.

The INS 40 can further include an inertial reference module 46. The inertial reference module 46 can include a set of inertial sensors 48 that can track one or a combination of inertial signals 50 that indicate at least one of the pitch ($\theta$), roll ($\varphi$), and yaw ($\psi$) rates associated with the aircraft 10. Each of the inertial sensors 48 are configured to provide measurement information to the inertial reference module 46. The measurement information can be filtered through a multi-state Kalman Filter 51 to correct for inertial sensor drift.

The inertial reference module 46 can further include a lookup table 52 for storing a predetermined heading value 54. The predetermined heading value 54 can be a set of values stored in the lookup table 52 that are associated with the heading 36 for the aircraft 10. A navigation filter 56 can be provided in the INS 40 for receiving the location signals 44, the inertial signals 50, and the predetermined heading values 54.

The set of aircraft systems 20 can further include a SATCOM system 60 with at least one receiver/transmitter 62 for receiving a directed signal 63 in the form of a directed satellite beam signal 64 from the satellite 34. The receiver/transmitter 62 can be in direct communication with the antenna 26. It is also contemplated that the receiver/transmitter 62 can be the antenna 26. A received signal 66 associated with the directed satellite beam signal 64 can be received by the INS 40 and can be received at the navigation filter 56 as a first heading observation 68a in the form of a signal strength 70. A second heading observation 68b, by way of non-limiting example at least one of the location signals 44, can also be received at the navigation filter 56.

The first heading observation 68a can be compared to the predetermined heading value 54 to determine a heading variance 72. The accuracy of the heading 36 can be indicated by a figure of merit (FOM) 74 which in turn, can indicate an amount of heading error expected by the navigation filter 56 and associated with the heading variance 72. In other words, the FOM 74 can be a numerical expression representing the performance or efficiency of the navigation filter 56. It is further contemplated that the first heading observation 68a along with the second heading observation 68b together are compared to the predetermined heading value 54 to determine the heading variance 72. Further still, determining the heading variance 72 can also include comparing the predetermined heading value 54 to the inertial signals 50. The heading variance 72 can be relayed to the antenna 26. It should be understood that the heading variance 72 can be a figure of merit based on the first heading observation 68a. It should be further understood that the heading variance 72 can be a set of figures based on the first heading observation 68a, second heading observation 68b, and inertial signals 50 when compared with the predetermined heading value 54.

The heading variance 72 can be received at a controller, or beam steering module 76, for controlling the azimuth and pitch of the antenna 26. In this regard, the antenna 26 can be adjusted so as to remain within a beam width (a) associated with an accurate pointing for the strongest satellite 34 to system 20 connection.

A cockpit display unit 78 located in the cockpit 16 can be operably coupled to the aircraft systems 20, including the INS 40 and the SATCOM system 60. Information associated with the aircraft system 20 can be relayed to the pilot via a flight display module 80. At least one indicator 90, by way of non-limiting example a numerical value associated with the heading variance 72 or the FOM 74, can provide an indication related to a validity of the heading of the aircraft 10 based on the heading variance 72. The at least one indicator 90 can be displayed at the flight display module 80. It is further contemplated that the indicator 90 can be re-evaluated in the navigation filter 56 and/or communicated directly with the antenna 26 as an adjustment signal 92. The adjustment signal 92 can cause a movement of the antenna 26 in order to remain within the beam width (a).

The cockpit display unit 78 can also be connected with other controllers (not shown) of the aircraft 10 and may include memory and processing units, which may be running any suitable programs to display information to the aircraft's pilots. The cockpit display unit 78 may include one or more graphic processors dedicated to rendering high resolution displays. The cockpit display unit 78 can also receive inputs from one or more other additional sensors (not shown), which can provide the cockpit display unit 78 with various information to aid in the operation of the aircraft 10.

Method steps that can be implemented by a program product including machine-executable instructions, such as program codes, for example, in the form of program modules executed by machines in networked environments will be described herein. Generally, program modules include routines, programs, objects, components, data structures, etc. that have the technical effect of performing particular tasks or implementing particular abstract data types. Machine-executable instructions, associated data structures, and program modules represent examples of program codes for executing steps of the method disclosed herein. The particular sequence of such executable instructions or associated data structures represents examples of corresponding acts for implementing the functions described in such steps.

Figure 3:
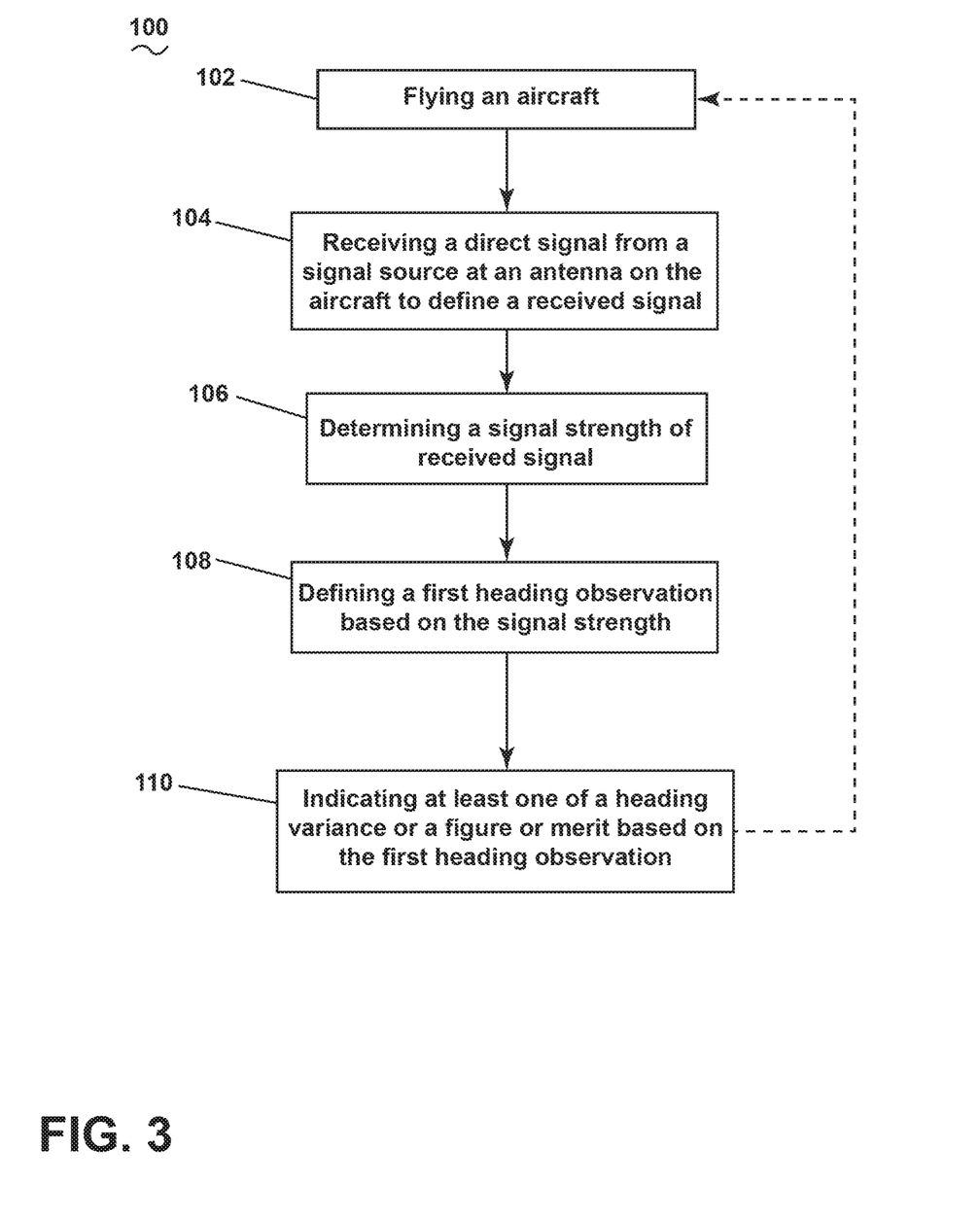
FIG. 3 is a flow diagram of a method of operating the aircraft according to an aspect of the disclosure herein.

Turning to FIG. 3, a method 100 of operating the aircraft 10, includes at 102, flying the aircraft 10 along the heading 36. At 104, receiving the directed signal 63 from a signal source, by way of non-limiting example the satellite 34, the at least one receiver/transmitter 62 via the antenna 26 on the aircraft 10 to define the received signal 66. At 106, the signal strength 70 associated with the received signal 66 can be determined. The signal strength 70 could be measured directly or calculated by the controller module 22 described herein with data received associated with the directed signal 63. By way of non-limiting example, a SATCOM receiver typically reports signal tracking strength as the ratio of received signal to noise. This is characterized for each type of receiver and this information can be used to indicate a strong signal above a certain signal to noise ratio. At 108, the first heading observation 68 can be defined based on the signal strength 70. At 110, one of the heading variance 72 or FOM 74 based on the first heading observation 68 is indicated, by way of non-limiting example with the indicator 90 being displayed at the flight display module 80. By way of non-limiting example, the heading variance 72 and FOM 74 are usually dependent on the application. For pointing solutions, a heading variance of 0.5 degrees may be acceptable to ensure the antenna is pointed within 1 degree of the satellite. For aircraft navigation purposes, the heading variance may need to be less than 0.05 degrees. FOM is usually associated with position as an indication of the error associated with position (FOM=1 means less than 20 meters of error; FOM=2 means less than 50 meters of error, etc.). For the disclosure herein, a heading variance can be more applicable, but the FOM is also considered. It should be understood that this method can be repeated or be continuous as illustrated in phantom. It will be understood that flying the aircraft continues throughout.

Figure 4:
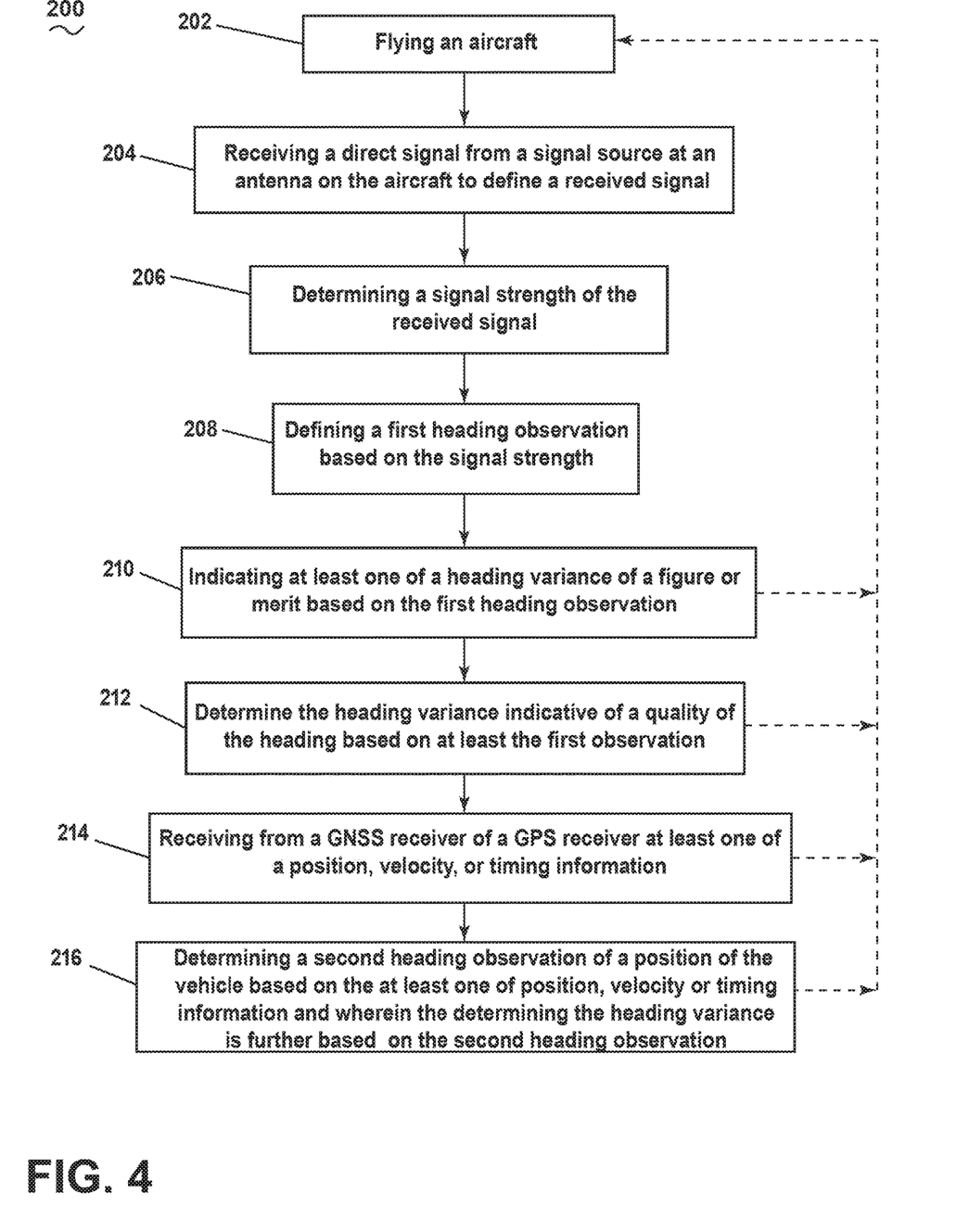
FIG. 4 is a flow diagram of another method of operating the aircraft according to another aspect of the disclosure herein.

FIG. 4 illustrates a flow chart of a method 200 with additional input possibilities. The method 200 is similar to the method 100 therefore, like parts will be identified with like numbers increased by 100, with it being understood that the description of the like parts of the method 100 applies to the method 200 unless otherwise noted. The method 100 can include at 112, determining the heading variance 72 indicative of a quality of the heading 36 based on at least the first heading observation 68 and at 114, receiving from the receiver 42 at least one of the position (x), velocity (v), or timing (t) information. The method 100 can further include at 116, determining the second heading observation 68b based on at least one of the position (x), velocity (v), or timing (t) information and determining the heading variance 72 based on the first and second heading observations 68a, 68b.

Figure 5:
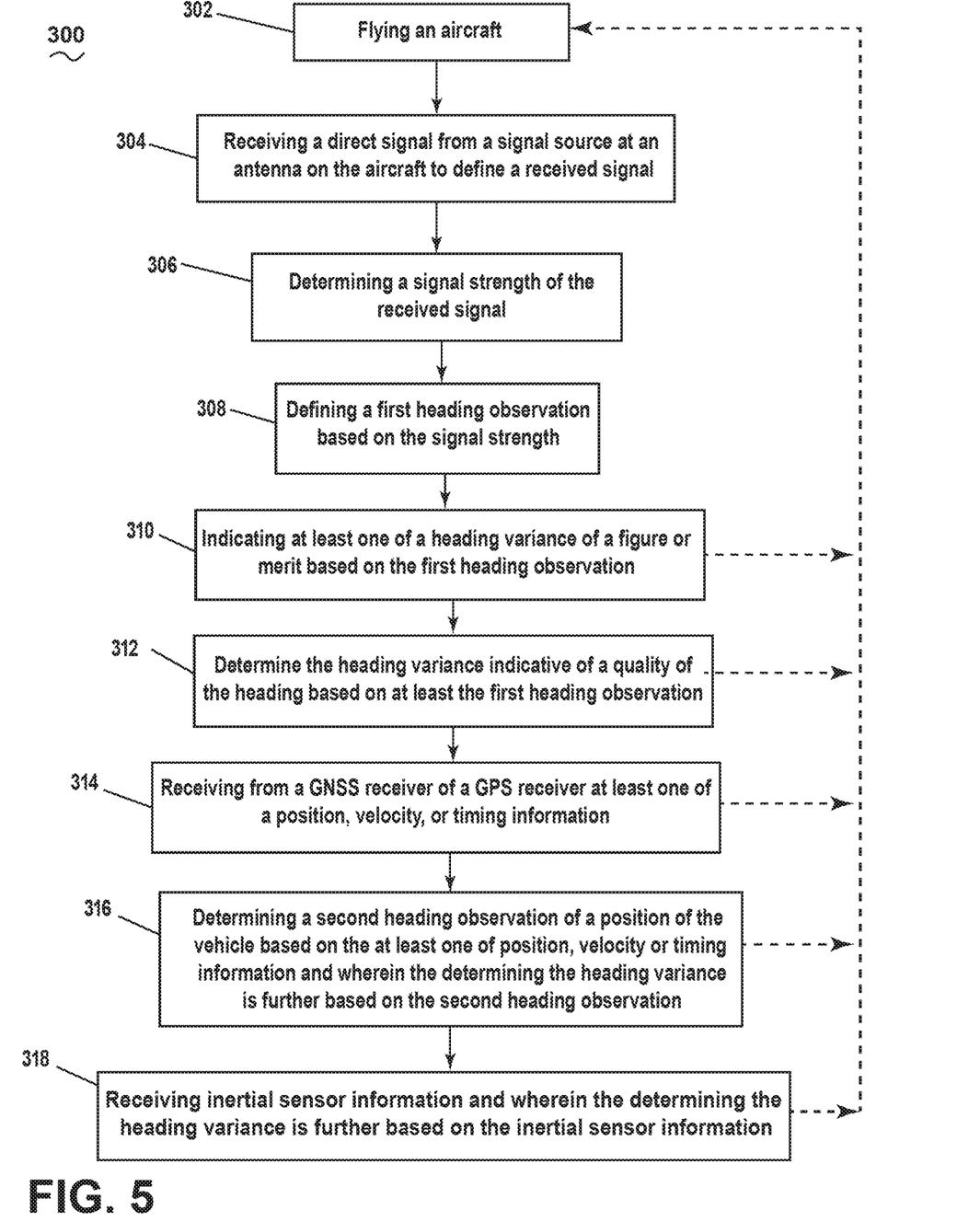
FIG. 5 is a flow diagram of yet another method of operating the aircraft according to another aspect of the disclosure herein.

FIG. 5 illustrates yet another flow chart with a method 300 is similar to the method 100 therefore, like parts will be identified with like numbers increased by 200, with it being understood that the description of the like parts of the method 100 applies to the method 300 unless otherwise noted. The method 300 further includes determining the heading variance 72 based on received inertial sensor information in the form of the inertial signal 50: at least one of the pitch ($\theta$), roll ($\varphi$), or yaw ($\psi$) rates.

As illustrated in phantom in each of FIGS. 4 and 5, the methods as described herein can include repeating the flying, receiving, determining, defining, and adjusting. It will be understood that, method 100 only describes receiving SATCOM input, method 200 receives GPS information, and method 300 receives inertial sensor information. In the event the location signal 44 as discussed herein becomes lost, the antenna 26 is more likely to remain within the beam width (a) such that the first heading observation 68a stays accurate longer when the satellite beam signal 63 is strong. Receiving SATCOM input, additional GPS information (when available), and additionally inertial sensor information increases the likelihood of remaining accurate longer.

An INS heading can drift and become less accurate when the location signals from the GPS are lost. In a typical system, the heading variance 72 can exceed one degree of error in less than 20 minutes without the location signals from GPS. At one degree of heading error the SATCOM system typically becomes disconnected.

In the event the location signal 44 as discussed herein becomes lost the satellite beam signal 63 remains strong and is used to generate heading observations even without the location signals 44. In this system, when using heading observations based on the beam tracking strength 70, heading drift is only caused by inertial system drift. For a typical INS used with a SATCOM system, this will mean the heading variance would not exceed one degree of error until at least after four hours.

An amount of heading drift while flying the aircraft 10 can be limited to inertial system drift. In this manner the heading drift of the aircraft 10 can be resilient to loss of receiving from the GNSS receiver and the GPS receiver. The method as described herein can be operable, in that the heading variance 72 can be determined in an environment denied radio navigation aids.

The method 100 as described herein includes providing the at least one of the heading variance 72 or the figure of merit 74 based on the first heading observation to the controller 76 for the antenna 26. The orientation of the antenna 26 can be adjusted according to the at least one of the heading variance 72 or the figure of merit 74, by way of non-limiting example, by mechanically altering the orientation of the antenna 26. The heading variance 72 can remain within one degree of error for a predetermined amount of time greater than 20 minutes and for as long as or exceeding 4 hours.

Technical effects of the above-described embodiments include that the method and apparatus as described herein provides a pointing solution for a SATCOM system. Known Inertial Reference Units (IRU) installations rely on GPS heading observations to maintain the solution over long periods of time. When a GPS signal is lost, the IRU limits connectivity of the SATCOM system. The method and apparatus as described herein extends the viability of the IRU in environments where GPS is lost or denied.

To the extent not already described, the different features and structures of the various embodiments can be used in combination with each other as desired. That one feature is not illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to describe aspects of the disclosure herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

1. A method of operating an aircraft, comprising flying an aircraft along a heading, receiving a directed signal from a signal source at an antenna on the aircraft to define a received signal, determining a signal strength of the received signal, defining a first heading observation based on the signal strength, and indicating at least one of a heading variance or a figure of merit based on the first heading observation.

2. The method of any preceding clause, further comprising determining the heading variance indicative of a quality of the heading based on at least the first heading observation.

3. The method of any preceding clause, further comprising receiving from a GNSS receiver or a GPS receiver at least one of position, velocity or timing information.

4. The method of any preceding clause, further comprising one of determining a second heading observation or a position of the vehicle based on the at least one of position, velocity or timing information and wherein the determining the heading variance is further based on the second heading observation.

5. The method of any preceding clause, further comprising receiving inertial sensor information and wherein the determining the heading variance is further based on the inertial sensor information.

6. The method of any preceding clause, wherein heading drift while flying the aircraft is limited to inertial system drift.

7. The method of any preceding clause, wherein heading drift of the aircraft is resilient to loss of receiving from the GNSS receiver and the GPS receiver.

8. The method of any preceding clause, wherein the determining the heading variance is operable in an environment denied radio navigation aids.

9. The method of any preceding clause, wherein the at least one of the heading variance or the figure of merit based on the first heading observation is provided to a controller for the antenna.

10. The method of any preceding clause, further comprising adjusting an orientation of the antenna according to the at least one of the heading variance or the figure of merit.

11. The method of any preceding clause, further comprising repeating the flying, receiving, determining, defining, and adjusting.

12. The method of any preceding clause, wherein the heading variance does not exceed one degree of error for a predetermined amount of time.

13. The method of any preceding clause, wherein adjusting the orientation of the antenna comprises mechanically altering the orientation of the antenna.

14. A communication system for a vehicle, comprising a directed communication receiver configured to output a signal related to beam tracking strength, an inertial reference module configured to receive the beam tracking strength and provide a heading observation based thereon, the inertial reference module configured to determine a heading variance indicative of a quality of a heading of the vehicle based on at least the heading observation and provide an output related to the heading variance, the inertial reference module configured to provide a heading observation and output related to the heading variance in a radio navigation aid deprived environment, and at least one indicator communicably coupled with the inertial reference module, providing an indication related to a validity of the heading of the vehicle based on the heading variance.

15. The communication system of any preceding clause, wherein the inertial reference module includes a lookup table with a predetermined heading value for the beam tracking strength.

16. The communication system of any preceding clause, wherein the at least one indicator is at least one of a figure of merit or a numerical value of a heading variance.

17. The communication system of any preceding clause, wherein the directed communication receiver is a moveable antenna assembly and the inertial reference module is further configured to provide a pointing solution to the moveable antenna assembly and wherein the pointing solution comprises at least two of: heading, pitch, roll, rates, position, and timing data.

18. The communications system of any preceding clause, further comprising at least one inertial sensor configured to provide measurement information to the inertial reference module and wherein the inertial reference module includes a multi-state Kalman Filter to correct for inertial sensor drift.

19. The communications system of any preceding clause, further comprising a global positioning system or radio navigation aid configured to determine an absolute position of the vehicle and provide the determined position to the inertial reference module and wherein the heading observation is independent from the global positioning system or radio navigation aid.

20. The communications system of any preceding clause, wherein the vehicle comprises an aircraft.

What is claimed is:

1. A method of operating an aircraft, comprising:
receiving a directed signal from a signal source at an antenna on the aircraft to define a received signal, the antenna having an adjustable orientation and being comprised within, or in communication with, a satellite communication system on the aircraft;
determining a signal strength of the received signal with the satellite communication system;
defining a first heading observation based on the signal strength; and
indicating at least one of a heading variance or a figure of merit based on the first heading observation.

2. The method of claim 1, further comprising determining the heading variance indicative of a quality of the heading based on at least the first heading observation.

3. The method of claim 2, further comprising receiving from a GNSS receiver or a GPS receiver at least one of position, velocity or timing information.

4. The method of claim 3, further comprising one of determining a second heading observation or a position of the aircraft based on the at least one of position, velocity or timing information and wherein the determining the heading variance is further based on the second heading observation.

5. The method of claim 4, further comprising receiving inertial sensor information and wherein the determining the heading variance is further based on the inertial sensor information.

6. The method of claim 5, wherein heading drift while flying the aircraft is limited to inertial system drift.

7. The method of claim 3, wherein heading drift of the aircraft is resilient to loss of receiving from the GNSS receiver and the GPS receiver.

8. The method of claim 2, wherein the determining the heading variance is operable in an environment denied radio navigation aids.

9. The method of claim 1, wherein the at least one of the heading variance or the figure of merit based on the first heading observation is provided to a controller for the antenna.

10. The method of claim 9, further comprising adjusting an orientation of the antenna according to the at least one of the heading variance or the figure of merit.

11. The method of claim 10, further comprising repeating the receiving, determining, defining, and adjusting.

12. The method of claim 11, wherein the heading variance does not exceed one degree of error for a predetermined amount of time.

13. The method of claim 10, wherein adjusting the orientation of the antenna comprises mechanically altering the orientation of the antenna.

14. A communication system for a vehicle, comprising:
a satellite communication system configured to receive a received signal and convert it to a beam tracking signal strength;
a directed communication receiver having an adjustable orientation and located within the satellite communication system, the directed communication receiver configured to output a received signal related to the beam tracking strength;
an inertial reference module configured to receive the received signal, convert the received signal to the beam tracking strength, and provide a heading observation based thereon, the inertial reference module configured to determine a heading variance indicative of a quality of a heading of the vehicle based on at least the heading observation and provide an output related to the heading variance, the inertial reference module configured to provide a heading observation and output related to the heading variance in a radio navigation aid deprived environment; and
at least one indicator communicably coupled with the inertial reference module, providing an indication related to a validity of the heading of the vehicle based on the heading variance.

15. The communication system of claim 14, wherein the inertial reference module includes a lookup table with a predetermined heading value for the beam tracking strength.

16. The communication system of claim 14, wherein the at least one indicator is at least one of a figure of merit or a numerical value of a heading variance.

17. The communication system of claim 14, wherein the directed communication receiver is a moveable antenna assembly and the inertial reference module is further configured to provide a pointing solution to the moveable antenna assembly and wherein the pointing solution comprises at least two of: heading, pitch, roll, rates, position, and timing data.

18. The communications system of claim 17, further comprising at least one inertial sensor configured to provide measurement information to the inertial reference module and wherein the inertial reference module includes a multi-state Kalman Filter to correct for inertial sensor drift.

19. The communications system of claim 14, further comprising a global positioning system or radio navigation aid configured to determine an absolute position of the vehicle and provide the determined position to the inertial reference module and wherein the heading observation is independent from the global positioning system or radio navigation aid.

20. The communications system of claim 14, wherein the vehicle comprises an aircraft.

* * * * *